(12) United States Patent
Park et al.

(10) Patent No.: US 10,356,509 B2
(45) Date of Patent: Jul. 16, 2019

(54) SIGNAL PROCESSING METHOD OF AUDIO SENSING DEVICE, AND AUDIO SENSING SYSTEM

(71) Applicant: SAMSUNG ELECTRONICS CO., LTD., Suwon-si (KR)

(72) Inventors: Sangha Park, Seoul (KR); Sungchan Kang, Hwaseong-si (KR); Cheheung Kim, Yongin-si (KR); Yongseop Yoon, Seoul (KR); Choongho Rhee, Anyang-si (KR); Hyeokki Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/823,881

(22) Filed: Nov. 28, 2017

(65) Prior Publication Data

US 2019/0028799 A1   Jan. 24, 2019

(30) Foreign Application Priority Data

Jul. 18, 2017   (KR) ........................ 10-2017-0091059

(51) Int. Cl.
*H04R 11/14*   (2006.01)
*H04R 17/10*   (2006.01)
(Continued)

(52) U.S. Cl.
CPC ............. *H04R 1/245* (2013.01); *H04R 3/005* (2013.01); *H04R 17/025* (2013.01); *H04R 17/10* (2013.01);
(Continued)

(58) Field of Classification Search
CPC .... H04R 1/245; H04R 17/025; H04R 29/006; H04R 7/08; H04R 29/00; H04R 11/14;
(Continued)

(56) References Cited

U.S. PATENT DOCUMENTS 5,432,779 A   7/1995   Shimo et al.
6,141,644 A   10/2000   Kuhn et al.
(Continued)

FOREIGN PATENT DOCUMENTS

JP          3358183 B2      12/2002
KR    10-2012-0041214 A     4/2012
KR    10-2016-0020287 A1    2/2016

OTHER PUBLICATIONS

U.S. Appl. No. 15/450,416, filed Mar. 6, 2017, Cheheung Kim.
(Continued)

*Primary Examiner* — Disler Paul
(74) *Attorney, Agent, or Firm* — Sughrue Mion, PLLC

(57) ABSTRACT

A signal processing method of an audio sensing device is provided. The audio sensing device includes a plurality of resonators, at least some of the plurality of resonators having different frequency bands. The method includes setting a plurality of time frames corresponding to the plurality of resonators, and calculating a sound feature for each of the plurality of time frames, the sound feature being calculated based on an audio signal detected by each of the plurality of the resonators, wherein the plurality of time frames are set independently for each of the frequency bands, and at least some of the plurality of time frames are set to have different time intervals.

19 Claims, 11 Drawing Sheets

(51) Int. Cl.
*H04R 1/24* (2006.01)
*H04R 17/02* (2006.01)
*H04R 29/00* (2006.01)
*H04R 3/00* (2006.01)
*H04R 1/28* (2006.01)
*H04R 9/18* (2006.01)
*G06F 17/14* (2006.01)
*H04R 7/08* (2006.01)

(52) U.S. Cl.
CPC ........... *H04R 29/006* (2013.01); *G06F 17/14* (2013.01); *H04R 1/28* (2013.01); *H04R 1/2807* (2013.01); *H04R 7/08* (2013.01); *H04R 9/18* (2013.01); *H04R 11/14* (2013.01); *H04R 2201/003* (2013.01); *H04R 2440/03* (2013.01)

(58) Field of Classification Search
CPC .... H04R 9/18; H04R 2440/03; H03H 9/2405; H03H 9/02259; H03H 9/00; H03H 2009/241; H03H 9/54; H03H 11/1208; H03H 2003/0471
USPC ...... 381/56, 92, 111; 73/649, 651, 655–657; 333/195–197; 310/334
See application file for complete search history.

(56) References Cited

U.S. PATENT DOCUMENTS

| 6,272,463 | B1 | 8/2001 | Lapere | |
|---|---|---|---|---|
| 7,417,517 | B2* | 8/2008 | Hernandez | H01P 1/203 333/202 |
| 9,479,884 | B2 | 10/2016 | Kim | |
| 2003/0095667 | A1* | 5/2003 | Watts | H04R 3/005 381/56 |
| 2006/0107744 | A1* | 5/2006 | Li | G01H 9/006 73/657 |
| 2009/0140612 | A1 | 6/2009 | Ikeuchi | |
| 2012/0167691 | A1 | 7/2012 | Gilg et al. | |
| 2016/0050506 | A1* | 2/2016 | Kim | H04R 17/025 381/56 |
| 2018/0038901 | A1 | 2/2018 | Kim et al. | |
| 2018/0131347 | A1* | 5/2018 | Rhee | H01L 41/083 |

OTHER PUBLICATIONS

George Tzanetakis et al., "Audio Analysis using the Discrete Wavelet Transform", XP002325896, 2001, 6 pages, Retrieved from the Internet at URL: <http://soundlab.cs.princeton.edu/publications/2001_amta_aadwt.pdf>, retrieved Apr. 25, 2005.

F. Germain, "The wavelet transform Applications in Music Information Retrieval", XP055486152, Dec. 21, 2009, 29 pages, Retrieved from the Internet at URL: <http://www.music.mcgill.ca/~ich/classes/mumt621_11/final%20projects/Final%20project%202009/francois/Final_Project_Report.pdf>, retrieved Jun. 20, 2018.

Communication dated Jun. 29, 2018, issued by the European Patent Office in counterpart European Application No. 17207060.9.

* cited by examiner

SIGNAL PROCESSING METHOD OF AUDIO SENSING DEVICE, AND AUDIO SENSING SYSTEM

CROSS-REFERENCE TO RELATED APPLICATION

This application claims priority from Korean Patent Application No. 10-2017-0091059, filed on Jul. 18, 2017, in the Korean Intellectual Property Office, the disclosure of which is incorporated herein in its entirety by reference.

BACKGROUND

1. Field

Apparatuses and methods consistent with exemplary embodiments relate to a signal processing method of an audio sensing device, and an audio sensing system

2. Description of the Related Art

In general, frequency domain information of an audio signal is obtained when the audio signal, input to a microphone having wide band characteristics, passes through an analog digital converter (ADC) and is Fourier transformed. This frequency information acquisition method creates a large computational burden due to the Fourier transformation. Also, as frequency resolving power and time resolving power have a trade-off relationship, it is difficult to simultaneously improve the resolving powers of time information and frequency information.

SUMMARY

One or more exemplary embodiments may provide a signal processing method of an audio sensing device, and an audio sensing system.

Additional exemplary aspects and advantages will be set forth in part in the description which follows and, in part, will be apparent from the description, or may be learned by practice of the presented exemplary embodiments.

According to an aspect of an exemplary embodiment, a signal processing method of an audio sensing device is provided. The audio sensing device includes a plurality of resonators, at least some of the plurality of resonators having different frequency bands. The method includes setting a plurality of time frames corresponding to the plurality of resonators, and calculating a sound feature for each of the plurality of time frames, the sound feature being calculated based on an audio signal detected by each of the plurality of the resonators, wherein the plurality of time frames are set independently for each the frequency bands, and at least some of the plurality of time frames are set to have different time intervals.

The plurality of time frames may be set to have time intervals corresponding to the frequency bands of the plurality of resonators.

The plurality of time frames may be set to have time intervals gradually decreasing as the frequency bands of the plurality of resonators increase.

The plurality of time frames may be set to have time intervals gradually decreasing as the frequency bands of the plurality of resonators decrease.

The plurality of time frames may be set to have time intervals that gradually decrease as at least one specific frequency band among frequency bands of the plurality of resonators is approached.

The plurality of time frames having the same time interval may be set in some of the plurality of resonators.

The plurality of resonators may have different frequency bands.

Some of the plurality of resonators may have the same frequency band.

Each of the plurality of resonators may include a fixed portion, a support portion extending from the fixed portion, and a sensor portion disposed on the support portion and sensing an audio signal according to deformation of the support portion.

The sensor portion may include a piezoelectric layer.

Each of the plurality of resonators may further include a mass body disposed on the support portion.

According to an aspect of another exemplary embodiment, an audio sensing system includes an audio sensing device including a plurality of resonators, at least some of the plurality of resonators having different frequency bands, a controller configured to set a plurality of time frames for each of the plurality of resonators of the audio sensing device, and a signal processor configured to calculate a sound feature for each of the plurality of time frames, the sound feature being calculated based on an audio signal detected by each of the plurality of the resonators, wherein the controller sets the plurality of time frames independently for each the frequency bands, and sets at least some of the plurality of time frames to have different time intervals.

The controller may set the plurality of time frames to have time intervals corresponding to the frequency bands of the plurality of resonators.

The controller may set the plurality of time frames to have time intervals gradually decreasing as the frequency bands of the plurality of resonators increase.

The controller may set the plurality of time frames to have time intervals gradually decreasing as the frequency bands of the plurality of resonators decrease.

The controller may set the plurality of time frames to have the same time interval in some of the plurality of resonators.

The plurality of resonators may have different frequency bands.

Some of the plurality of resonators may have the same frequency band.

Each of the plurality of resonators may include a fixed portion, a support portion extending from the fixed portion, and a sensor portion disposed on the support portion and sensing an audio signal according to deformation of the support portion.

Each of the plurality of resonator may further include a mass body disposed on the support portion.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
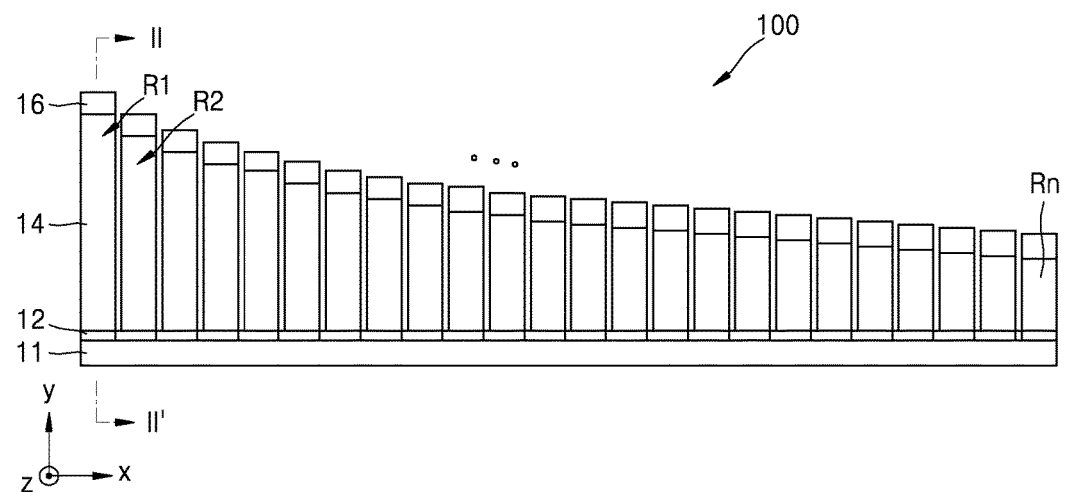
FIG. 1 is a plan view of an example of an audio sensing device including a plurality of resonators.

Reference will now be made in detail to exemplary embodiments which are illustrated in the accompanying drawings, wherein like reference numerals refer to like elements throughout. The thickness or size of each layer illustrated in the drawings may be exaggerated for convenience of explanation and clarity. Also, in the following description, when a material layer is described to exist on another layer, the material layer may exist directly on the other layer or a third layer may be interposed therebetween. Since a material forming each layer in the following embodiments is exemplary, other materials may be used therefor.

FIG. 1 is a plan view of an example of an audio sensing device 100 including a plurality of resonators.

Referring to FIG. 1, the audio sensing device 100 may include a plurality of the resonators R1, R2, . . . , Rn arranged in an array form. The resonators R1, R2, . . . , Rn may have different center frequencies. Accordingly, the resonators R1, R2, . . . , Rn may detect different frequency bands. Each of the resonators R1, R2, . . . , Rn may have a length of, for example, about several millimeters or less, but the present disclosure is not limited thereto.

FIG. 1 illustrates an example of n-number of resonators R1, R2, . . . , Rn arranged in an x-axis direction by decreasing length. The resonators R1, R2, . . . , Rn may be manufactured by, for example, a micro electro mechanical system (MEMS) process. As such, the audio sensing device 100 including the resonators R1, R2, . . . , Rn having different frequency bands may be used as a spectrum analyzer for analyzing an externally received spectrum.

Figure 2:
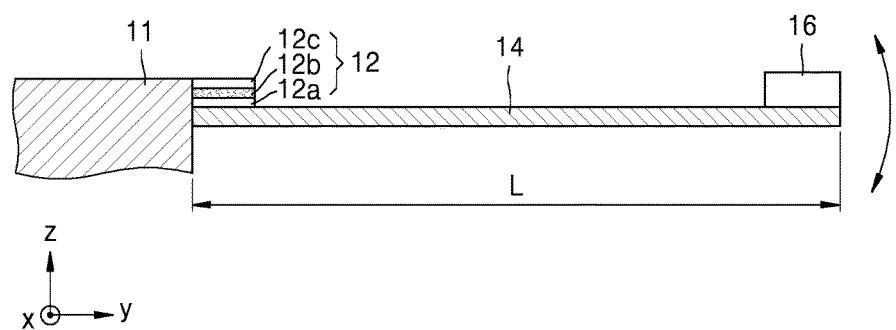
FIG. 2 is a cross-sectional view taken along line II-II' of FIG. 1.

FIG. 2 is a cross-sectional view taken along line II-II' of FIG. 1. FIG. 2 illustrates an example of a section of the first resonator R1.

Referring to FIG. 2, the first resonator R1 may include a fixed portion 11, a support portion 14, and a sensor portion 12. The first resonator R1 may further include a mass body 16 provided on the support portion 14. The fixed portion 11 serves to fix one side of the support portion 14, described later, and may generally include a material used as a substrate of an electronic element.

The support portion 14 may extend so that it protrudes from the fixed portion 11. FIG. 2 illustrates a case in which the support portion 14 protrudes from the fixed portion 11 in a y-axis direction. The support portion 14 may have, for example, a beam shape or a thin and long plate shape. Although the support portion 14 may include, for example, silicon, this is merely exemplary and the support portion 14 may include any of various other materials.

The support portion 14 may have one end side that is fixed by the fixed portion 11 and another end side that is not fixed and may therefore freely vibrate. FIG. 2 illustrates an example in which the other end side of the support portion 14 is capable of freely vibrating in a z-axis direction. In the above description, only the one end side of the support portion 14 is fixed to the fixed portion 11. However, both end sides of the support portion 14 may be fixed to the fixed portion 11. In this case, a center portion of the support portion 14 may freely vibrate up and down. A length L of the support portion 14 may be determined depending on a frequency band to be detected.

The mass body 16 may be further provided on a surface of the other end side of the support portion 14. The mass body 16 may be provided on an end portion of the other end side of the support portion 14 that is spaced apart from the fixed portion 11. Although the mass body 16 may include, for example, metal such as Au, this is merely exemplary and the mass body 16 may include any of various other materials. A weight of the mass body 16 may be determined depending on a frequency band to be detected.

The sensor portion 12 may be provided on a surface of the one end side of the support portion 14. For example, the sensor portion 12 may be provided on a surface of the one end side of the support portion 14 adjacent to the fixed portion 11. The sensor portion 12 detects a signal generated as the other end side of the support portion 14 vibrates due to the external audio, and may include, for example, a piezoelectric device.

In detail, the sensor portion 12 may include a lower electrode 12a, a piezoelectric material layer 12b, and an upper electrode 12c that are sequentially stacked over the surface of the one end side of the support portion 14. The lower electrode 12a and the upper electrode 12c may include a conductive material. For example, although the lower electrode 12a and the upper electrode 12c may include a metal such as Mo, the present disclosure is not limited thereto. Although not illustrated, an insulation layer may also be provided between the support portion 14 and the lower electrode 12a.

The piezoelectric material layer 12b may include a material that generates electric energy through deformation. For example, the piezoelectric material layer 12b may include at least one of AlN, ZnO, SnO, PZT, $ZnSnO_3$, polyvinylidene fluoride (PVDF), poly(vinylidene fluoride-trifluoroethylene) (P(VDF-TrFE)), and PMN-PT. However, the present disclosure is not limited thereto.

In the first resonator R1 having the above-described structure, the frequency band to detect may be determined according to at least one of, for example, the length L of the support portion 14 and the weight of the mass body 16. Other resonators, that is, the second, . . . , n-th resonators R2, . . . , Rn may have the same sectional structure as the first resonator R1 illustrated in FIG. 2. In each of the second, . . . , n-th resonators R2, . . . , Rn, like the first resonator R1, the frequency band to be detected may be determined according to at least one of, for example, the length L of the support portion 14 and the weight of the mass body 16.

FIG. 1 illustrates a case in which the first, second, . . . , n-th resonators R1, R2, . . . , Rn are arrayed by decreasing length in one direction, that is, the x-axis direction, and are arranged in a row in the x-axis direction. In this case, since the resonators R1, R2, . . . , Rn detect a higher frequency band as the length thereof decreases, the resonators R1, R2, . . . , Rn may detect a higher frequency band gradually increasing from the first resonator R1 toward the n-th resonator Rn.

When the external audio is input to the audio sensing device 100 including the resonators R1, R2, . . . , Rn as illustrated in FIGS. 1 and 2, the resonators R1, R2, . . . , Rn detect signals of different specific frequency bands and process the detected signals, and thus, information about the audio input to the audio sensing device 100 may be obtained.

In detail, when the external audio is input to the audio sensing device 100 including the resonators R1, R2, ..., Rn, and a specific frequency band of the audio matches a frequency band of a specific resonator of the resonators R1, R2, ..., Rn, the other end side of the specific resonator vibrates due to a resonance phenomenon, and thus an inertial force is generated. The inertial force generates a bending moment in the sensor portion 12 of each of the specific resonators R1, R2, ..., Rn. The bending moment causes stress in the piezoelectric material layer 12b of the sensor portion 12. Electric charges proportional to the amount of stress are generated in the piezoelectric material layer 12b. Accordingly, a voltage is generated between the upper electrode 12c and the lower electrode 12a, and thus a signal of the specific frequency band may be detected. As such, as signals of the specific frequency bands corresponding to the resonators R1, R2, ..., Rn are detected and the detected signals are processed, information about the audio input into the audio sensing device 100 may be obtained.

Although a case in which the sensor portion 12 detects an audio signal by using a piezoelectric method is exemplarily described above, exemplary embodiments are not limited thereto and the sensor portion 12 may detect an audio signal by using an electrostatic method.

A frequency band of audio obtainable by the audio sensing device 100 may be an audible frequency band in a range of, for example, about 20 Hz to 20 kHz. However, exemplary embodiments are not limited thereto, and the frequency band of audio obtainable by the audio sensing device 100 may be an ultrasonic wave band of about 20 kHz or higher or an ultra-low wave band of about 20 Hz or lower.

Figure 3:
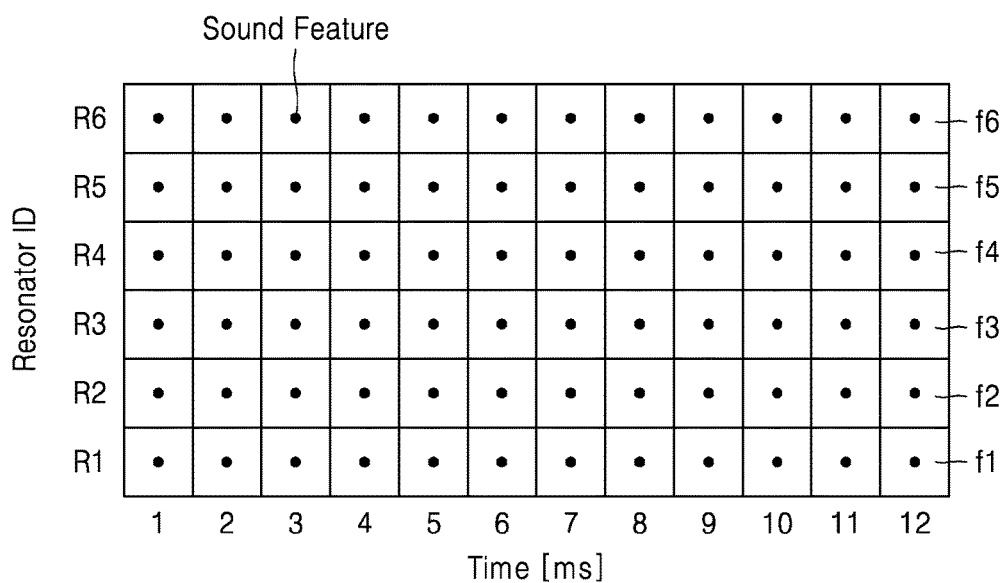
FIG. 3 illustrates a general signal processing method of the audio sensing device illustrated in FIG. 1.

FIG. 3 illustrates a signal processing method of the audio sensing device illustrated in FIG. 1. FIG. 3 illustrates an example in which the audio sensing device 100 includes six (6) resonators, that is, the first through sixth resonators R1, R2, ..., R6 arranged in an array form. The resonators R1 through R6 may detect frequency bands which gradually increase from the first resonator R1 toward the sixth resonator R6.

Referring to FIG. 3, to process the signals detected by the audio sensing device 100, time frames f1, f2, ..., f6 are set to correspond with the resonators R1, R2, ..., R6, respectively. Each of the time frames f1, f2, ..., f6 denote a unit time which constitutes one sound feature. For example, there are twelve time frames f1, and each of these twelve times frames corresponds to a single sound feature. The sound is denotes a representative value calculated based on the signal detected from the resonators R1, R2, ..., R6 during a certain time, that is, for example, one time frame, which may be, for example, the amplitude of a signal. For example, each of the twelve time frames f1, corresponding to the first resonator R1, may represent an amplitude of a signal detected by the resonator R1 during the time frame. However, exemplary embodiments are not limited thereto.

The first, second, ..., sixth time frames f1, f2, ..., f6 are set corresponding to the first, second, ..., sixth resonators R1, R2, ..., R6. The first, second, ..., sixth time frames f1, f2, ..., f6 are all set to have the same time interval. For example, each of the twelve time frames f1, corresponding to the first resonator R1, has a time interval of 1 ms. Likewise, each of the time frames f2 through f6, corresponding to the second through sixth resonators R2 though R6, also has a time interval of 1 ms.

When the external audio is input to the audio sensing device 100 including the first, second, ..., sixth resonators R1, R2, ..., R6, the first resonator R1 may detect a signal of the lowest frequency band according to the time. Sound features may be calculated based on the detected signal. The calculated sound features may be determined for each of the first time frames f1 that are sequentially set according to the time.

The second resonator R2 may detect a signal in a frequency band higher than that of the first resonator R1, according to the time. Sound features may be calculated based on the detected signal. The calculated sound features may be determined for each of the second time frames f2 that are sequentially set according to the time. The third resonator R3 may detect a signal in a frequency band higher than that of the second resonator R2 according to the time. Sound features may be calculated based on the detected signal. The calculated sound features may be determined for each of the third time frames f3 that are sequentially set according to the time.

The fourth resonator R4 may detect a signal in a frequency band higher than that of the third resonator R3 according to the time. Sound features may be calculated based on the detected signal. The calculated sound features may be determined for each of the fourth time frames f4 that are sequentially set according to the time. The fifth resonator R5 may detect a signal in a frequency band higher than that of the fourth resonator R4 according to the time. Sound features may be calculated based on the detected signal. The calculated sound features may be determined for each of the fifth time frames f5 that are sequentially set according to the time.

The sixth resonator R6 may detect a signal in a frequency band higher than that of the fifth resonator R5, that is, a signal of the highest frequency band, according to the time. Sound features may be calculated based on the detected signal. The calculated sound features may be determined for each of the sixth time frames f6 that are sequentially set according to the time.

As described above, sound features are determined for each of the time frames f1, f2, ..., f6 corresponding to the resonators R1, R2, ..., R6, and thus information about the audio input to the audio sensing device 100 may be extracted from the sound feature data. However, in the signal processing method, the time frames f1, f2, ..., f6 corresponding to the resonators R1, R2, ..., R6 are all set to have the same time interval. Accordingly, to obtain high-resolution audio information, the time frames f1, f2, ..., f6 may be set to have a short time interval. In this case, as the number of sound features increases, the amount of sound feature data also increases.

Figure 4:
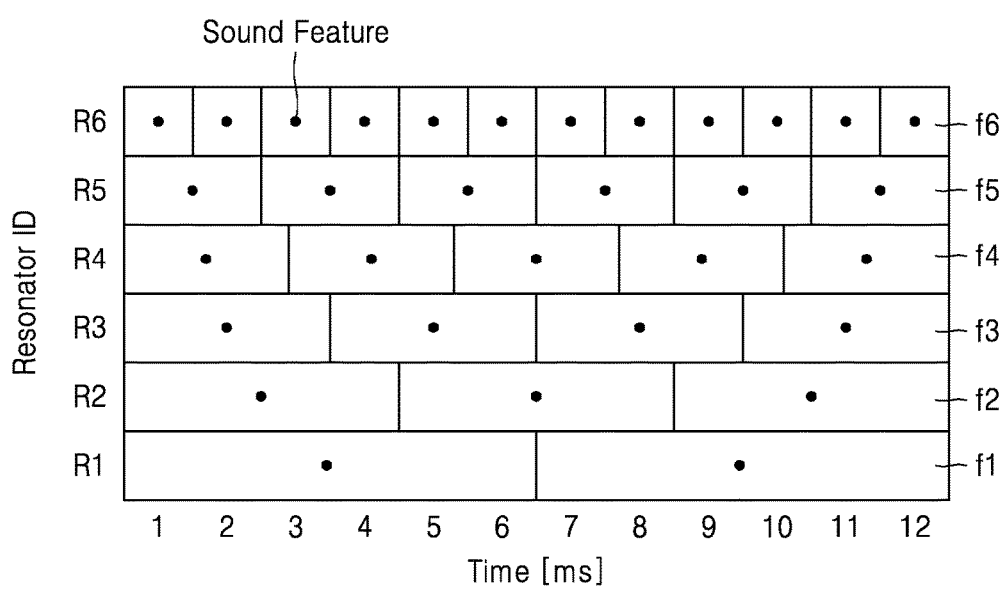
FIG. 4 illustrates a signal processing method of the audio sensing device illustrated in FIG. 1, according to an exemplary embodiment.

FIG. 4 illustrates a signal processing method of the audio sensing device illustrated in FIG. 1, according to an exemplary embodiment. FIG. 4 illustrates an example in which the audio sensing device 100 includes six resonators, that is, the first, second, ..., sixth resonators R1, R2, ..., R6, arranged in an array form. The resonators R1, R2, ..., R6 are arranged from the first resonator R1 toward the sixth resonator R6 to detect progressively higher frequency bands, which is also true for the first through sixth resonators of FIGS. 5 and 6. In FIG. 4, the time interval of time frames set for a low frequency band is relatively long and the time interval of time frames set for a high frequency band is relatively short.

Referring to FIG. 4, to process the signals detected by the audio sensing device 100, the time frames f1, f2, ..., f6 are set corresponding to the resonators R1, R2, ..., R6. In detail, the first, second, ..., sixth time frames f1, f2, ..., f6 are respectively set for the first, second, ..., sixth resonators R1, R2, . . . , R6. In the present exemplary embodiment, the time frames f1, f2, . . . , f6 may be set independently for the resonators R1, R2, . . . , R6. In other words, the time frames f1, f2, . . . , f6 may be set to have any of various time intervals regardless of the frequency bands of the resonators R1, R2, . . . , R6. The time interval of the time frames f1, f2, . . . , f6 may be, for example, about several microseconds (ms) to several seconds (s).

The time frames f1, f2, . . . , f6 corresponding to the resonators R1, R2, . . . , R6 may have different time intervals for each of the resonators. In detail, the time frames f1, f2, . . . , f6 may be set to have time intervals gradually decreasing as the frequency bands of the resonators R1, R2, . . . , R6 increase. In other words, the first time frames f1, having the longest time interval, may be sequentially set for the first resonator R1 having the lowest frequency band, according to the time. The second time frames f3, having a time interval shorter than that of the first time frame f1, may be sequentially set for the second resonator R2, according to the time.

Furthermore, the third time frames f3, having a time interval shorter than that of the second time frame f2, may be sequentially set for the third resonator R3, according to the time. The fourth time frames f4, having a time interval shorter than that of the third time frame f3, may be sequentially set for the fourth resonator R4, according to the time.

The fifth time frames f5, having a time interval shorter than that of the fourth time frame f4, may be sequentially set for the fifth resonator R5, according to the time. The sixth time frames f6 having the highest frequency band, having a time interval shorter than that of the fifth time frame f5, that is, the shortest time interval, may be sequentially set for the sixth resonator R6, according to the time.

When the time frames f1, f2, . . . , f6 are set as above, and the external audio is input to the audio sensing device 100, the first resonator R1 detects a signal having the lowest frequency band, according to the time. Sound features may be calculated based on the detected signal. The calculated sound features may be determined for each of the first time frames f1 that are sequentially set according to the time.

The second resonator R2 detects a signal of a frequency band higher than that of the first resonator R1, according to the time. Sound features may be calculated based on the detected signal. The calculated sound features may be determined for each of the second time frames f2 that are sequentially set according to the time. The third resonator R3 detects a signal of a frequency band higher than that of the second resonator R2 according to the time. Sound features may be calculated based on the detected signal. The calculated sound features may be determined for each of the third time frames f3 that are sequentially set according to the time.

The fourth resonator R4 detects a signal of a frequency band higher than that of the third resonator R3 according to the time. Sound features may be calculated based on the detected signal. The calculated sound features may be determined for each of the fourth time frames f4 that are sequentially set according to the time. The fifth resonator R5 detects a signal of a frequency band higher than that of the fourth resonator R4 according to the time. Sound features may be calculated based on the detected signal. The calculated sound features may be determined for each of the fifth time frames f5 that are sequentially set according to the time.

The sixth resonator R6 detects a signal of a frequency band higher than that of the fifth resonator R5, that is, the highest a signal of a frequency band, according to the time. Sound features may be calculated based on the detected signal. The calculated sound features may be determined for each of the sixth time frames f6 that are sequentially set according to the time.

For example, a signal change over time is slow for the lower frequency bands, and a signal change over time is faster for the higher frequency bands. In this case, the time interval of time frames set for a low frequency band may be large, and the time interval of time frames set for a high frequency band may be small. In other words, as illustrated in FIG. 4, by setting the time frames f1, f2, . . . , f6 to have time intervals gradually decreasing as the frequency bands of the resonators R1, R2, . . . , R6 increase, the number of sound features determined for the time frames f1, f2, . . . , f6 may be much reduced as compared to the exemplary embodiment of FIG. 3. Accordingly, high-resolution audio information may be obtained without increasing the amount of the sound feature data.

Figure 5:
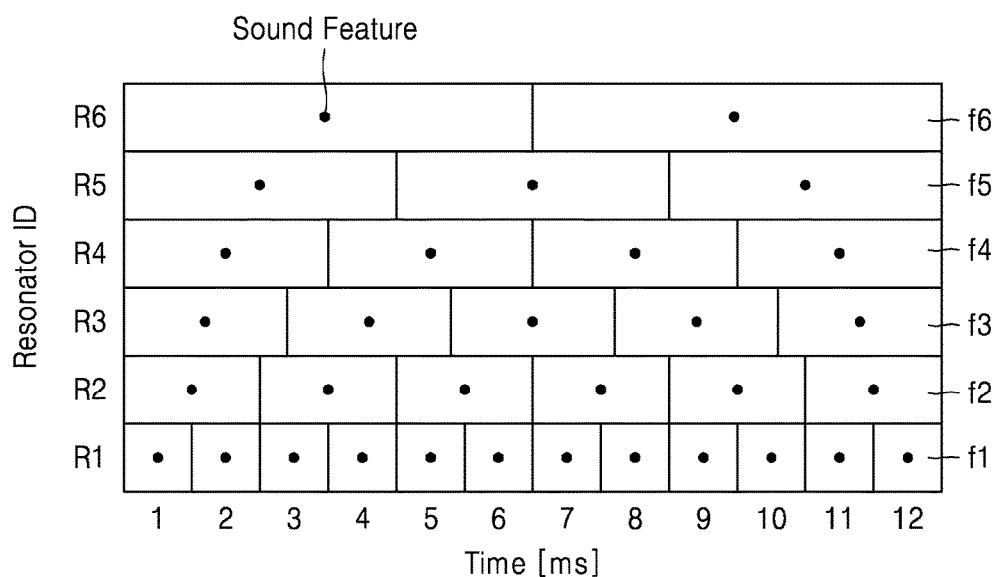
FIG. 5 illustrates a signal processing method according to another exemplary embodiment.

FIG. 5 illustrates a signal processing method according to another exemplary embodiment. FIG. 5 illustrates a case in which the time intervals for time frames set for the lower frequency bands are shorter and the time intervals for time frames for the higher frequency bands are longer.

Referring to FIG. 5, to process the signals detected by the audio sensing device 100, the time frames f1, f2, . . . , f6 are set corresponding to the resonators R1, R2, . . . , R6. In detail, the first, second, . . . , sixth time frames f1, f2, . . . , f6 are respectively set for the first, second, . . . , sixth resonators R1, R2, . . . , R6. In the present exemplary embodiment, the time frames f1, f2, . . . , f6 may be set independently for the resonators R1, R2, . . . , R6. In other words, the time frames f1, f2, . . . , f6 may be set to have any of various time intervals regardless of the frequency bands of the resonators R1, R2, . . . , R6s. The time intervals of the time frames f1, f2, . . . , f6 may be, for example, about several microseconds (ms) to several seconds (s).

The time frames f1, f2, . . . , f6 corresponding to the resonators R1, R2, . . . , R6 may have different time intervals for each of the resonators. In detail, the time frames f1, f2, . . . , f6 may be set to have time intervals gradually increasing as the frequency bands of the resonators R1, R2, . . . , R6 increase. In other words, the first time frames f1 having the shortest time interval may be sequentially set for the first resonator R1 having the lowest frequency band according to the time. The second time frames f2 having a time interval longer than that of the first time frame f1 may be sequentially set for the second resonator R2 according to the time.

Furthermore, the third time frames f3 having a time interval longer than that of the second time frame f2 may be sequentially set for the third resonator R3 according to the time. The fourth time frames f4 having a time interval longer than that of the third time frame f3 may be sequentially set for the fourth resonator R4 according to the time.

The fifth time frames f5 having a time interval longer than that of the fourth time frame f4 may be sequentially set for the fifth resonator R5 according to the time. The sixth time frames f6 having a time interval longer than that of the fifth time frame f5, that is, the longest time interval, may be sequentially set for the sixth resonator R6 according to the time.

For example, due to the characteristics of the audio signal input to the audio sensing device 100, the lower frequency bands may include more desirable audio information than the higher frequency bands. In this case, the time intervals of time frames set for the lower frequency bands may be decreased, and the time intervals of time frames set for the higher frequency bands may be increased. In other words, as illustrated in FIG. 5, when the time frames f1, f2, . . . , f6 are set to have time intervals gradually increasing as the frequency bands of the resonators R1, R2, ..., R6 increase, audio information of the low frequency band may be obtained at a higher resolution without increasing the amount of sound feature data.

In view of the audio signal input to the audio sensing device 100, when desired audio information is included in a specific frequency band between a high frequency band and a low frequency band, the time intervals of the time frames set for the specific frequency band may be decreased, and the time intervals set for the frequency bands higher than the specific frequency band and for the frequency bands lower than the specific frequency band may be increased.

Figure 6:
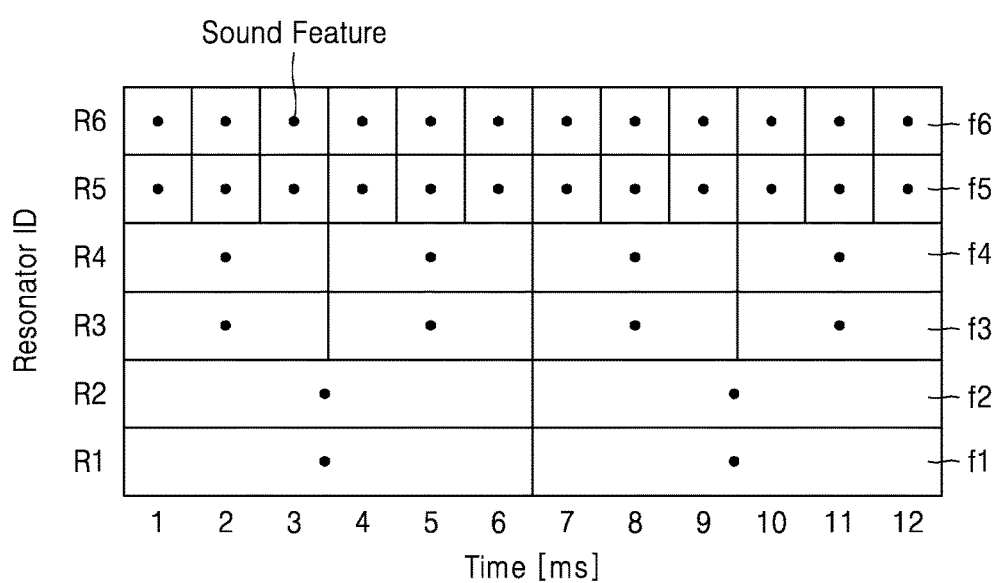
FIG. 6 illustrates a signal processing method according to another exemplary embodiment.

FIG. 6 illustrates a signal processing method according to another exemplary embodiment. FIG. 6 illustrates a case in which time frames f1, f2, ..., f6 are set such that the time frames corresponding to some of the resonators R1, R2, ..., R6 are the same.

Referring to FIG. 6, to process the signals detected by the audio sensing device 100, the time frames f1, f2, ..., f6 are set corresponding to the resonators R1, R2, ..., R6. In detail, the first, second, ..., sixth time frames f1, f2, ..., f6 are respectively set for the first, second, ..., sixth resonators R1, R2, ..., R6. In the present exemplary embodiment, the time frames f1, f2, ..., f6 may be set independently for the resonators R1, R2, ..., R6. In other words, the time frames f1, f2, ..., f6 may be set to have any of various time intervals regardless of the frequency bands of the resonators R1, R2, ..., R6. The time interval of each of the time frames f1, f2, ..., f6 may be, for example, about several microseconds (ms) to several seconds (s).

Some of the time frames f1, f2, ..., f6 may be set to have the same time intervals. In detail, time frames having the same time interval may be set for some of the resonators having adjacent frequency bands. For example, the first and second time frames f1 and f2, for the first and second resonators R1 and R2, may have the same time interval, the third and fourth time frames f3 and f4 for the third and fourth resonators R3 and R4 may have the same time interval, and the fifth and sixth time frames f5 and f6 for the fifth and sixth resonators R5 and R6 may have the same time interval. Accordingly, the first and second time frames f1 and f2 having the same time intervals may be set for the first and second resonators R1 and R2, the third and fourth time frames f3 and f4 having the same time intervals may be set for the third and fourth resonators R3 and R4, and the fifth and sixth time frames f5 and f6 having the same time intervals may be set for the fifth and sixth resonators R5 and R6.

FIG. 6 illustrates a case in which the time frames having the same time intervals are set for two resonators having adjacent frequency bands of the resonators. However, exemplary embodiments are not limited thereto, and the number of the resonators R1, R2, ..., R6 for which the time frames f1, f2, ..., f6 having the same time interval are set may vary. Furthermore, although FIG. 6 illustrates the time frames f1, f2, ..., f6 having time intervals gradually decreasing as the frequency bands of the resonators R1, R2, ..., R6 increase, this is merely exemplary.

Figure 7:
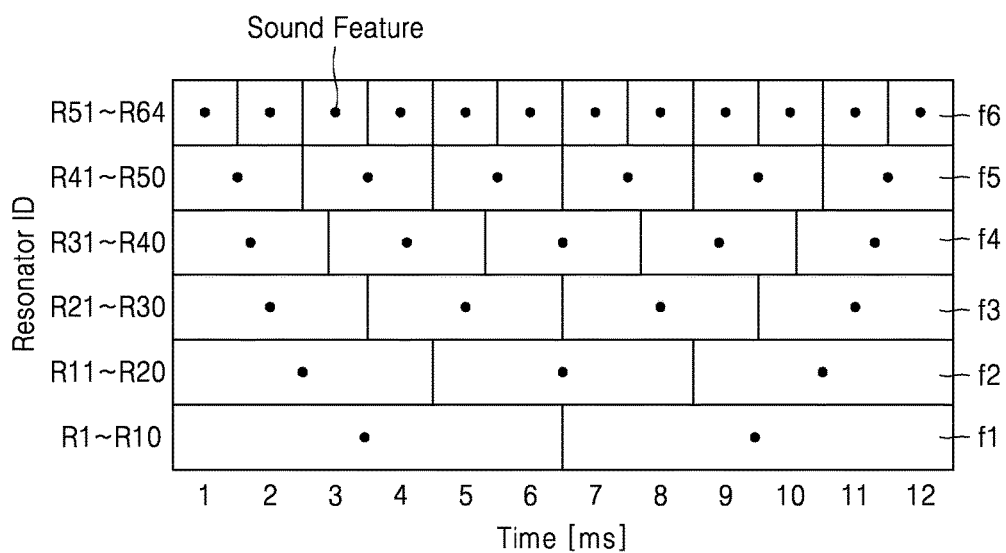
FIG. 7 illustrates a signal processing method according to another exemplary embodiment.

FIG. 7 illustrates a signal processing method according to another exemplary embodiment. FIG. 7 illustrates an example in which an audio sensing device includes sixty four resonators arranged in an array form, that is, first, second, ..., sixty-fourth resonators R1, R2, ..., R64. The resonators R1, R2, ..., R64 are arranged in order from the first resonator R1 toward the sixty-fourth resonator R64, where the frequency bands detected by the resonators increases from the first through the sixth-fourth resonator.

Referring to FIG. 7, the first time frames f1 having the longest time interval may be sequentially set for the first to tenth resonators R1 to R10 according to the time. The second time frames f2 having a time interval shorter than that of the first time frame f1 may be sequentially set for the eleventh to twentieth resonators R11 to R20 according to the time.

The third time frames f3 having a time interval shorter than that of the second time frame f2 may be sequentially set for the twenty-first to thirtieth resonators R21 to R30 according to the time. The fourth time frames f4 having a time interval shorter than that of the third time frame f3 may be sequentially set for the thirty-first to fortieth resonators R31 to R40 according to the time.

The fifth time frames f5 having a time interval shorter than that of the fourth time frame f4 may be sequentially set for the forty-first to fiftieth resonators R41 to R50 according to the time. The sixth time frames f6 having a time interval shorter than that of the fifth time frame f5, that is, the shortest time interval, may be sequentially set for the fifty-first to sixty-fourth resonators R51 to R64 according to the time. The time interval of each of the time frames f1, f2, ..., f6 may be, for example, about several microseconds (ms) to several seconds (s).

The setting of the time frames f1, f2, ..., f6 in FIG. 7 is merely exemplary, and the number of the resonators R1, R2, ..., R64 for which the time frames f1, f2, ..., f6 having the same time interval are set may vary. Furthermore, although FIG. 7 illustrates the time frames f1, f2, ..., f6 having time intervals decreasing as the frequency bands of the resonators R1, R2, ..., R64 increase, this is merely exemplary.

According to the above-described exemplary embodiments, in the audio sensing device including a plurality of resonators arranged in an array form, the time frames corresponding to the resonators may be set independently for each of the frequency bands of the resonators, and may be set so that any or each of the resonators may have time frames different from that of other resonators. In other words, the time frames corresponding to the resonators may be set such that at least some of the time frames have different time intervals. For example, a time frame having a relatively short time interval is set for a frequency band including desirable audio information, and a time frame having a relatively long time interval may be set for the other frequency bands. Accordingly, high-resolution audio information may be extracted without increasing the amount of sound feature data.

Figure 8A:
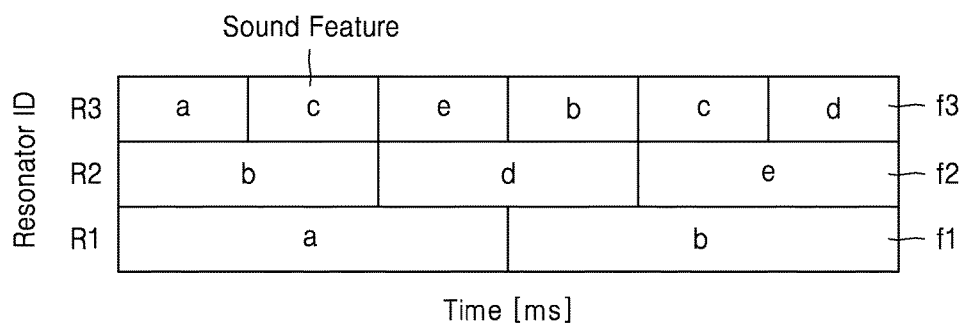
FIGS. 8A and 8B illustrate a signal processing method according to another exemplary embodiment.
Figure 8B:
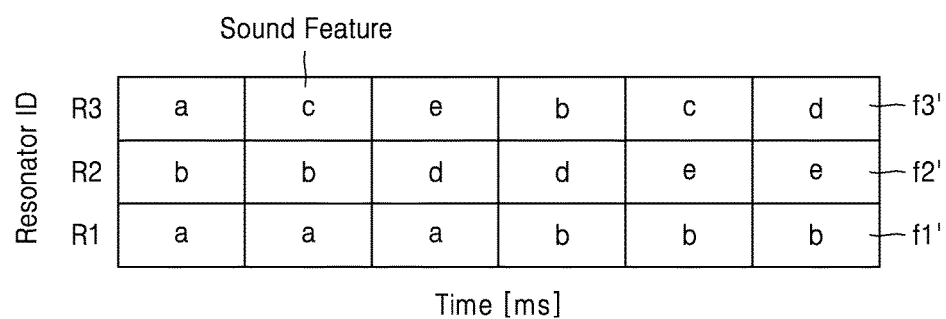

FIGS. 8A and 8B illustrate a signal processing method according to another exemplary embodiment.

FIG. 8A illustrates time frames f1, f2, and f3 and sound features a, b, c, d, and e set according to an exemplary embodiment. Referring to FIG. 8A, first, second, and third time frames f1, f2, and f3 are set corresponding to first, second and third resonators R1, R2, and R3, respectively. The first time frames f1 are set to have the longest time interval, and the third time frames f3 are set to have the shortest time interval. The sound features a, b, c, d, and e are calculated for the time frames f1, f2, and f3.

FIG. 8B illustrates that sound feature data illustrated in FIG. 8A is reprocessed. Referring to FIG. 8B, the first and second time frames f1 and f2 may be reprocessed to have the same time intervals as that of the third time frames f3. Accordingly, the first, second, and third time frames f1, f2, and f3 are all reprocessed to have the same time intervals. As such, the sound features a, b, c, d, and e may be determined for the first, second and third time frames f1', f2', and f3', which are reprocessed to have the same time intervals, as illustrated in FIG. 8B. The reprocessing work as illustrated in FIG. 8B may be necessary when the sound feature data based on the time frames f1, f2, and f3 having different time intervals as illustrated in FIG. 8A are extracted, and then the extracted sound feature data are reprocessed based on the time frames f1', f2', and f3' having the same time intervals.

Figure 9:
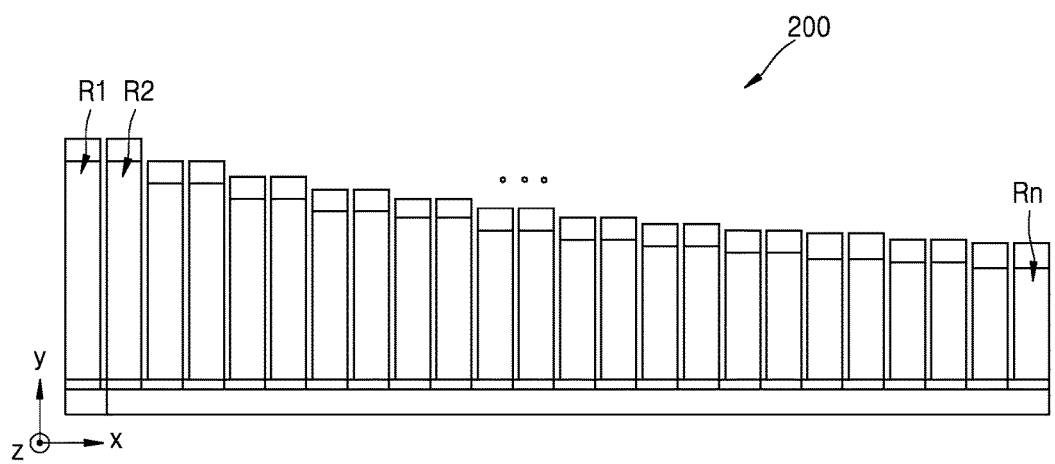
FIG. 9 illustrates an audio sensing device according to another exemplary embodiment.

FIG. 9 illustrates an audio sensing device 200 according to another exemplary embodiment.

In the audio sensing device 200 illustrated in FIG. 9, n-number of resonators R1, R2, . . . , Rn are arranged in the x-axis direction. In this case, two neighboring resonators of the resonators R1, R2, . . . , Rn may have the same length. In this case, the neighboring two resonators may have the same frequency band, but exemplary embodiments are not limited thereto. FIG. 9 illustrates a case in which the neighboring two resonators of the resonators have the same length. However, the number of the resonators having the same length of the resonators R1, R2, . . . , Rn may vary, the resonators having the same length of the resonators R1, R2, . . . , Rn may not be arranged adjacent to each other.

FIGS. 10A to 10F illustrate audio sensing devices according to other exemplary embodiments. FIGS. 10A to 10F illustrate examples of various arrangements of resonators of audio sensing devices 300, 400, 500, 600, 700, and 800. In the audio sensing devices 300, 400, 500, 600, 700, and 800 of FIGS. 10A to 10F, fixed portions of the resonators are not illustrated for convenience of explanation.

Figure 10A:
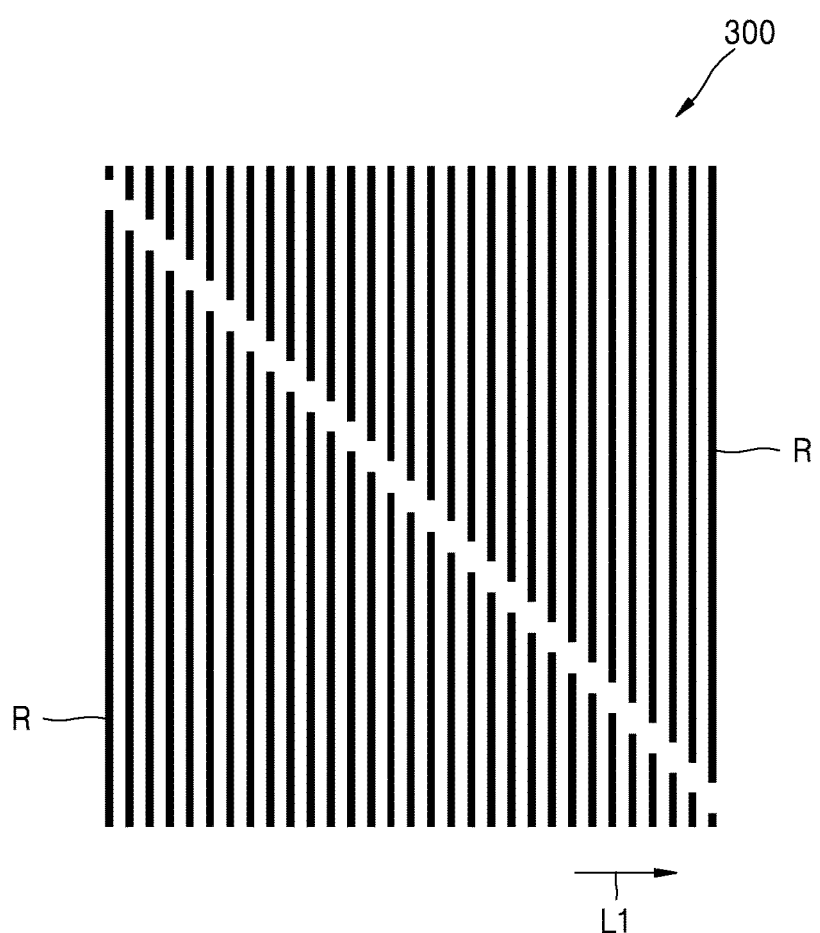
FIGS. 10A to 10F illustrate audio sensing devices according to other embodiments.
Figure 10B:
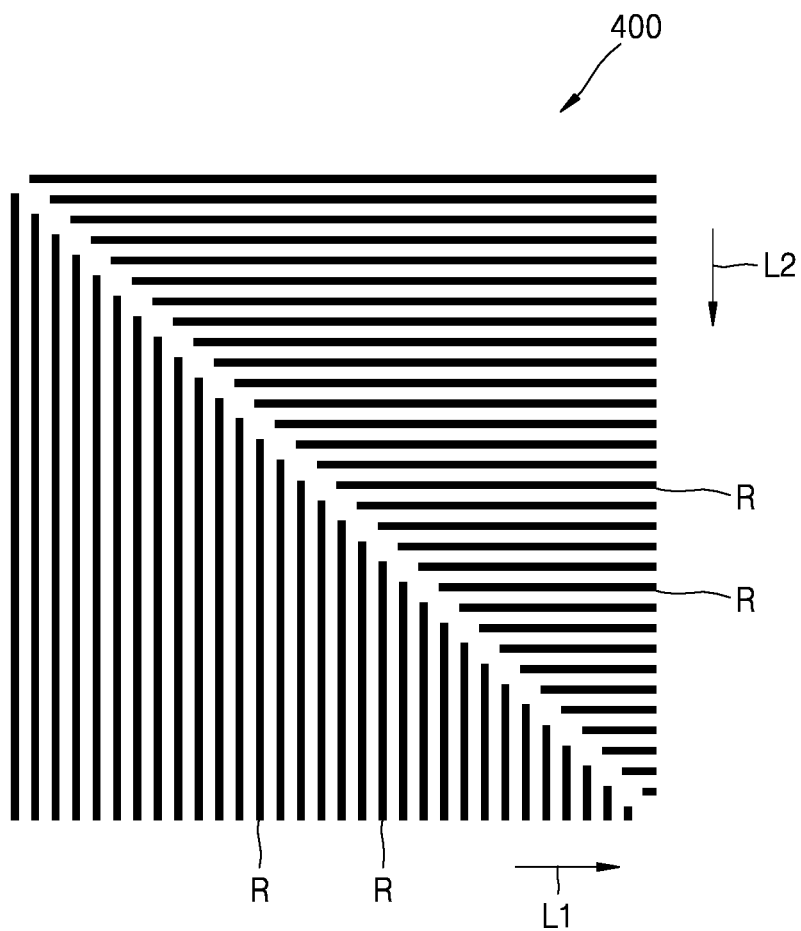
Figure 10C:
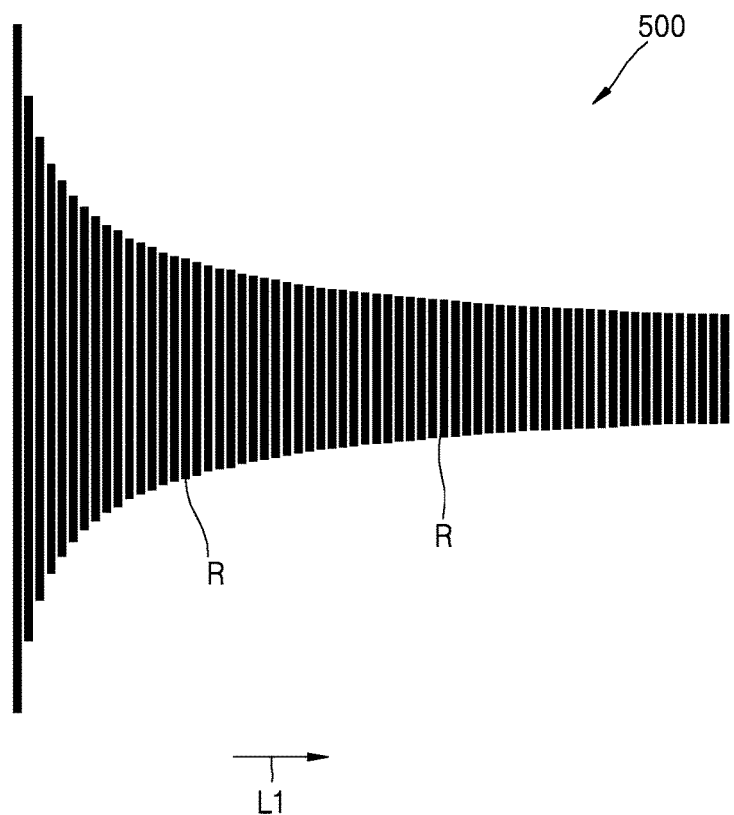
Figure 10D:
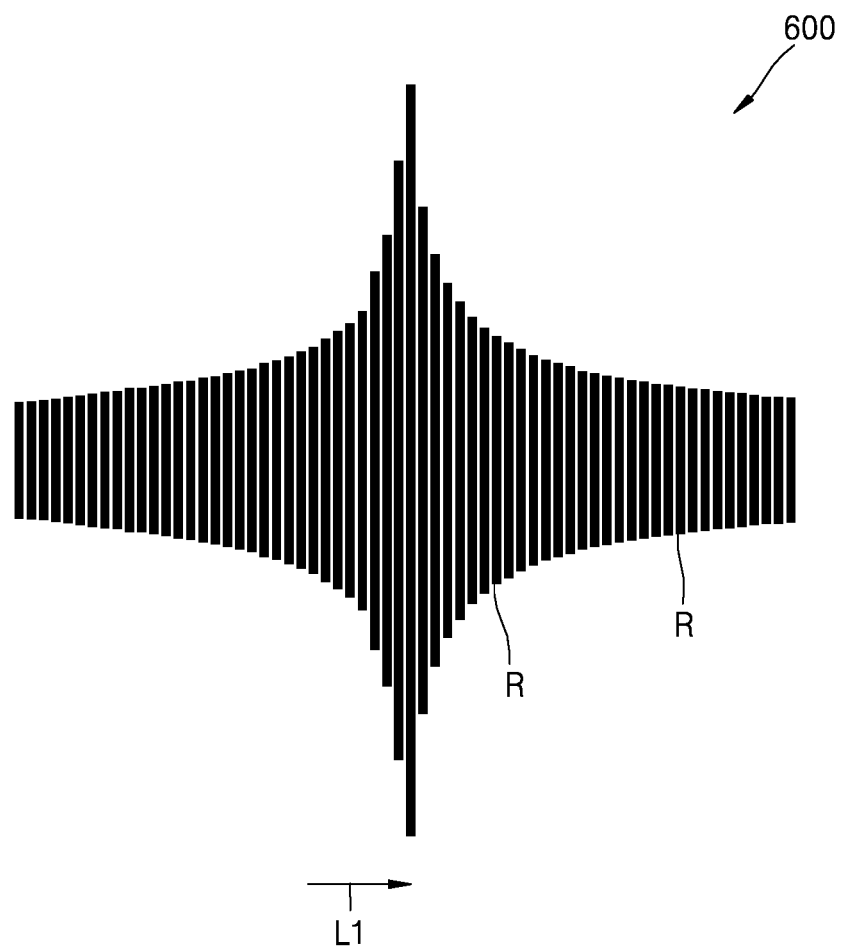
Figure 10E:
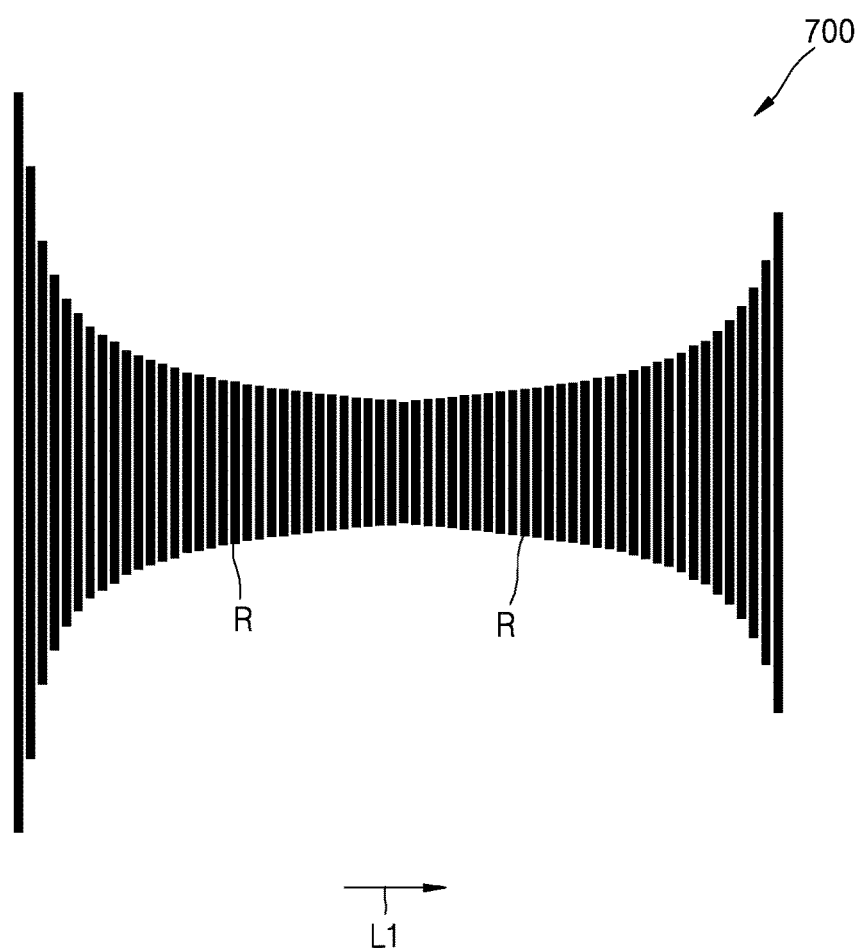
Figure 10F:
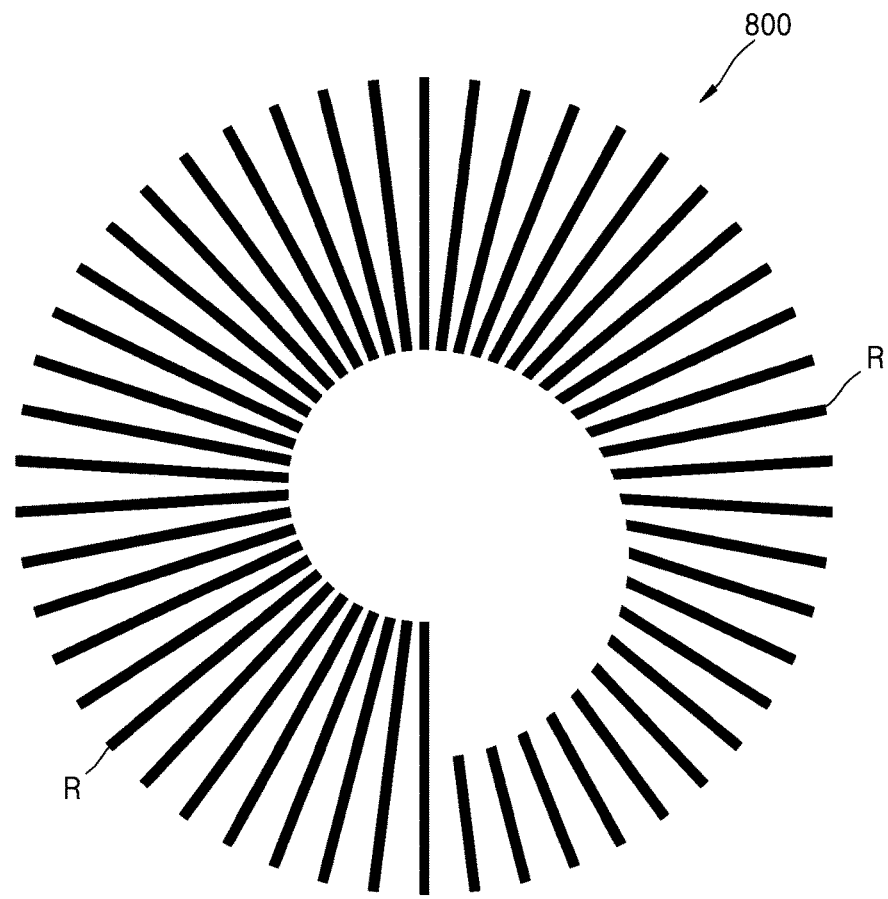

In the audio sensing device 300 illustrated in FIG. 10A, resonators R are arranged in an upper row and a lower row, in which the resonators R in the upper row are arranged with lengths increasing in a first direction L, and the resonators R in the lower row are arranged with lengths decreasing in the first direction L1. In the audio sensing device 400 illustrated in FIG. 10B, resonators R are arranged with lengths decreasing in first and second directions L and L2. In the audio sensing device 500 illustrated in FIG. 10C, resonators R are arranged in a horizontal symmetrical form, with their lengths decreasing in the first direction L1. In the audio sensing device 600 illustrated in FIG. 10D, resonators R are arranged in a horizontal symmetrical form, with lengths increasing and then decreasing in the first direction L1. In the audio sensing device 700 illustrated in FIG. 10E, resonators R are arranged in a horizontal symmetrical form, with lengths decreasing and then increasing in the first direction L1. In the audio sensing device 800 illustrated in FIG. 10F, resonators R are arranged with lengths decreasing in a clockwise direction.

The above-described arrangements of resonators R are merely exemplary, and resonators R may be arranged in any of various forms in addition thereto. The resonators R may be provided to have entirely different lengths or some of the resonators R of an audio sensing device may have the same length, and the widths or thicknesses thereof may vary.

Figure 11:
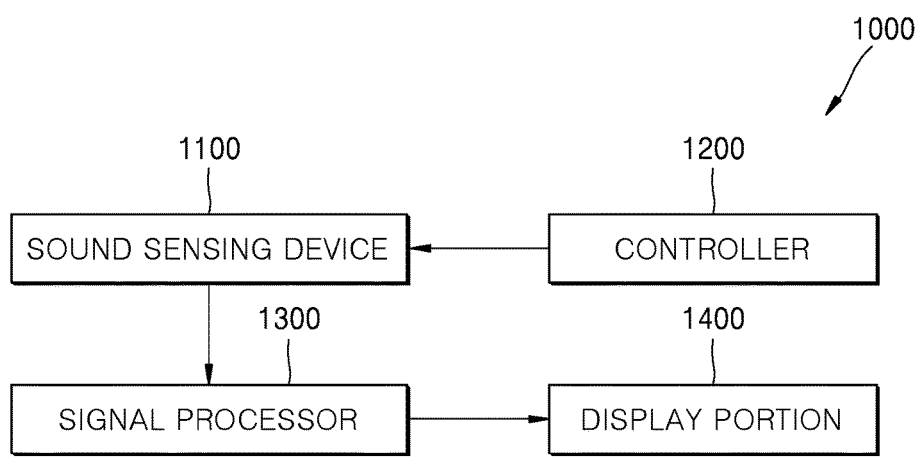
FIG. 11 illustrates an audio sensing system according to an exemplary embodiment.

FIG. 11 illustrates an audio sensing system 1000 according to an exemplary embodiment.

Referring to FIG. 11, the audio sensing system 1000 may include an audio sensing device 110, a controller 1200, and a signal processor 1300. The audio sensing device 110 may include a plurality of resonators (not shown), at least some of the resonators having different frequency bands. Each of the resonators may include, as described above, a fixed portion, a support portion extending from the fixed portion in one direction, a sensor portion provided on the support portion and sensing an audio signal according to deformation of the support portion, and a mass body provided on the support portion. The audio sensing device 1100 may include, for example, any one or more of the audio sensing devices 100, 200, 300, 400, 500, 600, 700, and 800 illustrated in FIG. 1 and FIGS. 9 to 10F. Since examples of the audio sensing device 1100 are already described above, a detailed description thereof is omitted herein.

The controller 1200 sets a plurality of time frames corresponding to the resonators of the audio sensing device 1100. The controller 1200 may set the time frames independently for each of the frequency bands of the resonators, and may set at least some of time frames to have different time intervals. The controller 1200 may set the time frames to have time intervals in consideration of the frequency feature of the audio input to the audio sensing device 1100. The time frames may be set by, for example, any one of the methods illustrated in FIGS. 4 to 7. Since exemplary methods of setting the time frames are described above, a detailed description thereof is omitted herein.

When audio is input to the audio sensing device 1100, the resonators detect audio signals having corresponding frequency bands according to the time. The signal processor 1300 calculates sound features using the audio signals detected by the resonators, and determines the sound features for each of the time frames set by the controller 1200. Since an exemplary method of calculating the sound features for the time frames is described above, a detailed description thereof is omitted herein. Information about the audio input to the audio sensing device 1100 may be extracted from the sound feature data configured by the signal processor 1300. The audio sensing system 1000 may further include a display portion 1400 for outputting the information about the audio.

As described above, according to the above-described exemplary embodiments, in an audio sensing device including a plurality of resonators arranged in an array form, at least some of the resonators having different frequency bands, the time frames corresponding to the resonators may be set independently for the frequency bands of the resonators, and may be set to have any of various time intervals. In other words, at least some of the time frames corresponding to the resonators may be set to have different time intervals. For example, time frames having a short time interval may be set for a frequency band including desirable audio information, and time frames having a long time interval may be set for other frequency bands. Accordingly, high-resolution audio information may be extracted without increasing the sound feature data.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A signal processing method of an audio sensing device, the method comprising: for each of a plurality of resonators of the audio sensing device, setting a plurality of time frames having a time interval according to a frequency band, wherein a first frequency band of a first resonator among the plurality of resonators is different from a second frequency band of a second resonator among the plurality of resonators, and time frames set for the first resonator have a first time interval according to the first frequency band and time frames set for the second resonator have a second time interval according to the second frequency band, different from the first time interval; and calculating a sound feature for each of the plurality of time frames for each of the plurality of resonators, each sound feature being calculated based on an audio signal detected by one of the plurality of resonators.

2. The signal processing method of an audio sensing device of claim 1, wherein the setting the plurality of time frames comprises, for each of the plurality of resonators, setting the plurality of time frames to have time intervals corresponding to a frequency band of a resonator.

3. The signal processing method of an audio sensing device of claim 2, wherein the setting the plurality of time frames comprises setting the plurality of time frames to have time intervals gradually decreasing as frequency bands of the plurality of resonators increase.

4. The signal processing method of an audio sensing device of claim 2, wherein the setting the plurality of time frames comprises setting the plurality of time frames to have time intervals gradually decreasing as frequency bands of the plurality of resonators decrease.

5. The signal processing method of an audio sensing device of claim 1, wherein the setting the plurality of time frames comprises setting the plurality of time frames to have time intervals that gradually decrease as a specific frequency band of the plurality of resonators is approached.

6. The signal processing method of an audio sensing device of claim 1, wherein the setting the plurality of time frames comprises setting the plurality of time frames for at least two of the plurality of resonators to have a same time interval.

7. The signal processing method of an audio sensing device of claim 1, wherein at least two of the plurality of resonators have a same frequency band.

8. The signal processing method of an audio sensing device of claim 1, wherein each of the plurality of resonators comprises:
   a fixed portion, a support portion extending from the fixed portion, and a sensor portion disposed on the support portion;
   wherein the method further comprises sensing the audio signal according to deformation of the support portion of each of the plurality of resonators.

9. The signal processing method of an audio sensing device of claim 8, wherein the sensor portion comprises a piezoelectric layer.

10. The signal processing method of an audio sensing device of claim 8, wherein each of the plurality of resonators further comprises a mass body disposed on the support portion.

11. An audio sensing system comprising: an audio sensing device including a plurality of resonators, wherein a first frequency band of a first resonator of the plurality of resonators is different from a second frequency band of a second resonator of the plurality of resonators; a controller configured to set, for each of the plurality of resonators, a plurality of time frames having a time interval according to a frequency band, wherein time frames set for at least the first resonator have a first time interval according to the first frequency band and time frames set for at least the second resonator have a second time interval according to the second frequency band, different from the first time interval; and a signal processor configured to calculate a sound feature for each of the plurality of time frames for each of the plurality of resonators, each sound feature being calculated based on an audio signal detected by one of the plurality of resonators.

12. The audio sensing system of claim 11, wherein, for each of the plurality of resonators, the controller sets the plurality of time frames to have time intervals corresponding to a frequency band of a resonator.

13. The audio sensing system of claim 12, wherein the controller sets the plurality of time frames for the plurality of resonators to have time intervals gradually decreasing as frequency bands of the plurality of resonators increase.

14. The audio sensing system of claim 12, wherein the controller sets the plurality of time frames for the plurality of resonators to have time intervals gradually decreasing as frequency bands of the plurality of resonators decrease.

15. The audio sensing system of claim 11, wherein the controller sets the plurality of time frames for at least two of the plurality of resonators to have the same time interval.

16. The audio sensing system of claim 11, wherein each of the plurality of resonators has a different frequency band.

17. The audio sensing system of claim 11, wherein at least two of the plurality of resonators have a same frequency band.

18. The audio sensing system of claim 11, wherein each of the plurality of resonators comprises a fixed portion, a support portion extending from the fixed portion, and a sensor portion disposed on the support portion and configured to sense the audio signal according to deformation of the support portion.

19. The audio sensing system of claim 18, wherein each of the plurality of resonators further comprises a mass body disposed on the support portion.

* * * * *